US012771175B2

(12) United States Patent
Sieklik et al.

(10) Patent No.: US 12,771,175 B2
(45) Date of Patent: Oct. 20, 2026

(54) MAGNETIC COVER AND METHODS AND APPARATUS TO DETECT POSITIONING OF THE MAGNETIC COVER OVER A WIRELESS CHARGING TRANSMITTER

(71) Applicant: NXP B.V., Eindhoven (NL)

(72) Inventors: Ivan Sieklik, Martin (SK); Radek Holis, Karolinka (CZ); Petr Smejkal, Valasske Mezirici (CZ)

(73) Assignee: NXP B.V., Eindhoven (NL)

( * ) Notice: Subject to any disclaimer, the term of this patent is extended or adjusted under 35 U.S.C. 154(b) by 619 days.

(21) Appl. No.: 18/465,429

(22) Filed: Sep. 12, 2023

(65) Prior Publication Data

US 2025/0088033 A1 Mar. 13, 2025

(51) Int. Cl.
*H02J 50/12* (2016.01)
*G01V 3/10* (2006.01)

(52) U.S. Cl.
CPC .............. *H02J 50/12* (2016.02); *G01V 3/101* (2013.01)

(58) Field of Classification Search
None
See application file for complete search history.

(56) References Cited

U.S. PATENT DOCUMENTS 12,046,922 B2 * 7/2024 Goodchild ............ H02J 50/005
2024/0154470 A1 * 5/2024 Serafimoska-Nedanovska ........... H01Q 1/22

FOREIGN PATENT DOCUMENTS

DE 10202110128858 B3 2/2023

OTHER PUBLICATIONS

U.S. Appl. No. 18/063,495, “Method and Apparatus for Combining Magnetic and Non-Magnetic Multi-Coil Wireless Charging,” filed Dec. 8, 2022.

* cited by examiner

*Primary Examiner* — Kristy A Haupt

(57) ABSTRACT

A magnetic cover is disclosed which is configured to be positioned on a wireless charging transmitter. The magnetic cover comprises: a magnetic ring positioned on the magnetic cover, wherein when the magnetic cover is positioned on a wireless charging transmitter, the magnetic ring encompasses a center planar charging coil of the wireless charging transmitter; and a plurality of passive identification circuits, each identification circuit having a respective resonance frequency. When the magnetic cover is positioned over a wireless charging transmitter, the plurality of passive identification circuits overlaps with a side planar charging coil of the wireless charging transmitter and the side planar charging coil overlaps with center planar charging coil. The disclosed magnetic cover is facilitates detection by the wireless charging transmitter and wireless charging in accordance with magnetic power profile (MPP) charging.

20 Claims, 6 Drawing Sheets

MAGNETIC COVER AND METHODS AND APPARATUS TO DETECT POSITIONING OF THE MAGNETIC COVER OVER A WIRELESS CHARGING TRANSMITTER

FIELD OF USE

This disclosure generally relates to wireless charging, and more particularly to a magnetic cover configured to be positioned over a wireless charging transmitter and methods and apparatus to detect positioning of the magnetic cover over the wireless charging transmitter.

BACKGROUND

Wireless Power Consortium (WPC) specifies various wireless charging standards including Qi and Qi2. Qi defines a basic power profile (BPP) and an extended power profile (EPP) for wireless charging while Qi2 defines a magnetic power profile (MPP) for wireless charging. A wireless charging transmitter has overlapping coils to facilitate wireless charging. In BPP and EPP charging, the wireless charging transmitter selects one of three overlapping coils of the wireless charging transmitter to transmit an electromagnetic signal to a coil of a wireless charging receiver of a wireless device to charge the wireless device. For MPP charging, a magnetic ring is integrated around the coil of the wireless charging receiver and similarly a magnetic ring is integrated around a center coil of the three overlapping coils of the wireless charging transmitter. The magnets allow the wireless charging transmitter to attach to the wireless charging receiver and align the center coil of the transmitter with the coil of the receiver to provide efficient wireless charging of the wireless device up to 15 watts in an example based on the MPP charging. If the wireless charging transmitter is not integrated with the magnetic ring, the wireless charging transmitter is not able to charge based on the MPP charging and charging is limited to a lower power associated with EPP and BPP charging even if the wireless charging receiver is configured with MPP charging in addition to EPP and BPP charging.

Figure 1:
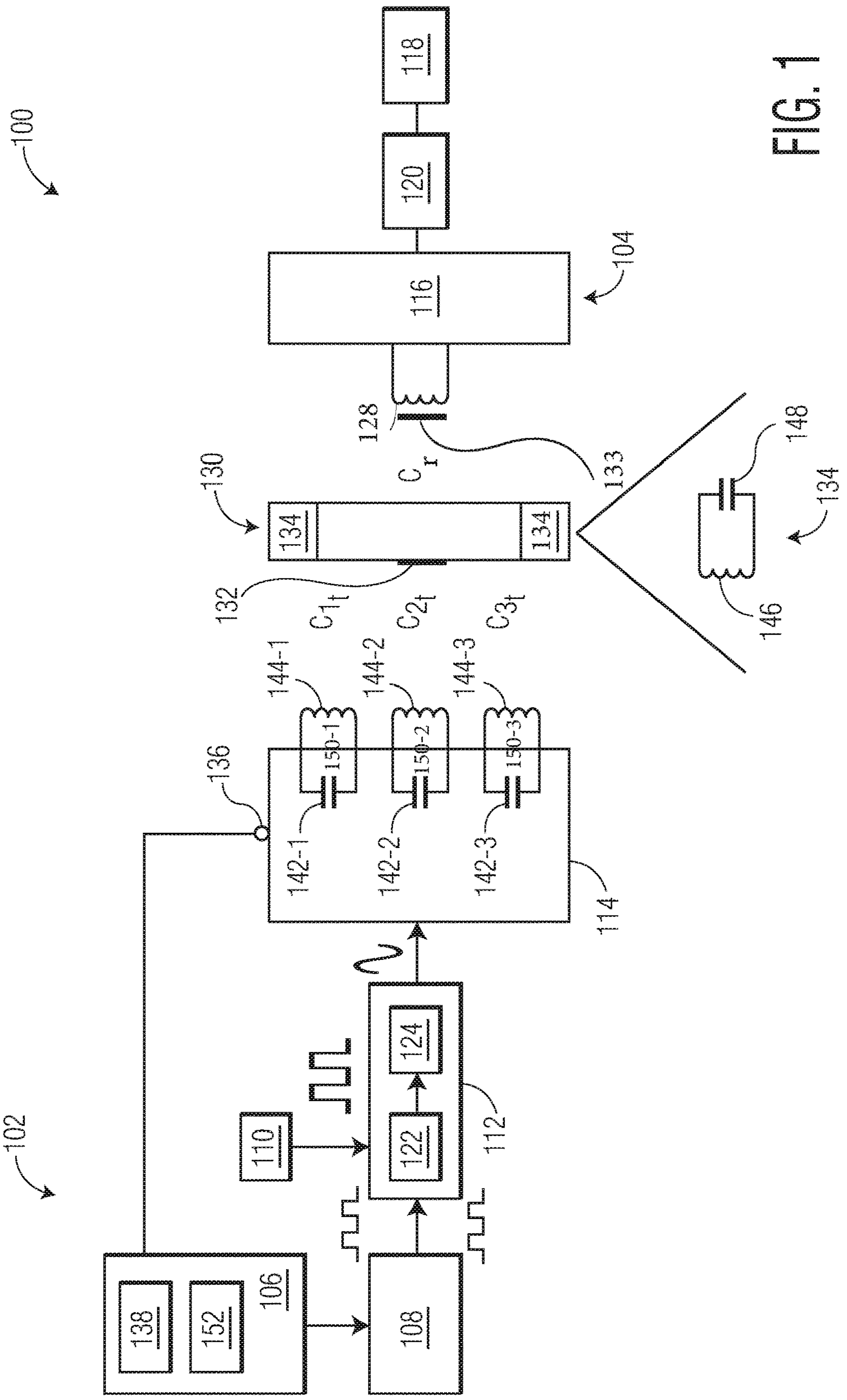
FIG. 1 illustrates an example wireless charging system in accordance with an embodiment.

The drawings are for the purpose of illustrating example embodiments, but it is understood that the embodiments are not limited to the arrangements and instrumentality shown in the drawings.

DETAILED DESCRIPTION

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

A magnetic cover is positioned over a wireless charging transmitter which comprises a center coil and side coils to allow magnetic power profile (MPP) charging with a wireless charging receiver which supports MPP charging when the wireless charging transmitter itself is not configured to support MPP charging. In an example, the wireless charging receiver which supports MPP charging also supports basic power profile (BPP) and an extended power profile (EPP) charging. The magnetic cover has a magnetic ring that aligns around the center coil of the wireless charging transmitter so that when the wireless device having the wireless charging receiver is positioned proximate to the wireless charging transmitter the center coil of the wireless charging transmitter is aligned with a coil of the wireless charging receiver of the wireless device to provide efficient MPP wireless charging.

The wireless charging transmitter is configured to detect positioning of the magnetic cover. Some magnetic covers have physical connectors such as pins that connect to an interface of the wireless charging transmitter to allow the wireless charging transmitter to detect positioning of the magnetic cover. The positioning that is detected is the magnetic cover being over the wireless transmitter in an example. If the magnetic cover is not detected, the wireless charging transmitter operates with BPP or EPP charging using a selected coil of the three coils in the wireless charging transmitter. If the magnetic cover is detected, the wireless charging transmitter operates with MPP charging using a center coil of the three coils in the wireless charging transmitter.

In some examples, the magnetic cover is not detected when present or falsely detected when not present creating a fire risk. For instance, the physical connectors such as pins of the magnetic cover that connect to an interface of the wireless charging transmitter to allow the wireless charging transmitter to detect positioning of the magnetic cover could be broken or not reliably indicate the positioning of the magnetic cover due to moisture infiltration as an example. If the magnetic cover is present and not detected, the wireless charging transmitter operates in the EPP charging but a coil selected for EPP charging might result in overheating of the magnetic ring in the magnetic cover. Alternatively, a foreign object such as a pen or a paper clip could be falsely detected as a magnetic cover. The foreign object could create a fire risk if the wireless charging transmitter operates with MPP charging.

Embodiments disclosed herein are directed to a magnetic cover which has a magnetic ring and one or more passive identification circuits. The magnetic cover is positioned over the wireless charging transmitter comprising three planar coils but not a magnetic ring around a center coil typically associated with MPP charging. By positioning the magnetic cover over the wireless charging transmitter, the magnetic ring is positioned around a center coil of the three planar coils. The magnetic ring in the magnetic cover allows for aligning the center coil of the wireless charging transmitter with the coil of the wireless charging receiver which supports MPP charging when the wireless charging receiver is proximate to the wireless charging transmitter to perform MPP charging. The wireless charging transmitter is able to detect positioning of the magnetic cover by detecting presence of the passive identification circuit. Before charging, the wireless charging transmitter generates and transmits an electromagnetic signal and detects a response of the electromagnetic signal indicative of presence or absence of the passive identification circuit. If the response indicates that the passive identification circuit is present, then the wireless charging transmitter performs MPP charging with the center coil in the wireless charging transmitter which is aligned with the coil of the wireless charging receiver because positioning of the magnetic cover with the magnetic ring over the wireless charging transmitter facilitates coil alignment with the coil of the wireless charging receiver. If the response indicates that the passive identification circuit is not present, then the wireless charging transmitter will perform EPP or BPP charging using a selected coil of three coils in the wireless charging transmitter because the magnetic cover is not positioned over the wireless charging transmitter. The magnetic cover with the passive identification circuit allows for reliable detection of the magnetic cover so that MPP charging is performed when the magnetic cover is present and EPP or BPP charging is performed when the magnetic cover is not present. The use of the passive identification circuit in the magnetic cover also reduces risk of overheating or fire. The wireless charging transmitter is able to avoid falsely detecting a presence of foreign object as a positioning of a magnetic cover and operate with MPP charging or fail to detect positioning of the magnetic cover and operate with the EPP or BPP charging. Well known instructions, protocols, structures, and techniques have not been shown in detail in order not to obfuscate the description.

FIG. 1 illustrates an example wireless charging system 100 in accordance with an embodiment. The charging system 100 includes a wireless charging transmitter 102 and a wireless charging receiver 104. The wireless charging transmitter 102 includes various circuitry including a controller 106, a pulse width modulation (PWM) circuit 108, a power source 110, an alternating current generator 112, and a transmit front-end circuit 114. The wireless charging receiver 104 includes a load circuit 116. The load circuit 116 may be coupled to a battery 120 and wireless device circuitry 118 associated with a wireless device such as a smartphone where the battery 120 is capable of being charged by the wireless charging transmitter 102 and wireless charging receiver 104. In an example, the wireless device may include one or more of the wireless device circuitry 118, the battery 120, and the wireless charging receiver 104. The wireless charging system 100 and associated circuitry or components as described herein may be implemented with one or more of analog circuitry, mix signal circuitry, memory circuitry, logic circuitry, and processing circuitry that executes code stored in a memory that when executed by the processing circuitry performs the disclosed functions.

In an example, the wireless charging transmitter 102 may output an electromagnetic signal which is received by the wireless charging receiver 104 to charge the battery 120. The controller 106 may generate control signals which are provided to the PWM circuit 108. The control signals may define characteristics of the electromagnetic signal that is to be generated and transmitted by the transmit front end 114 including an amplitude and phase of the electromagnetic signal. The PWM circuit 108 may receive these control signals and generate drive signals in the form of a PWM wave to drive the AC generator 112. The AC generator 112 may include a bridge circuit 122 such as a half bridge circuit or full bridge circuit in an example. A full bridge is a type of electrical circuit that allows current to flow in both directions between two pairs of conductors, as opposed to a half-bridge, which only allows current to flow in one direction. In an example, the drive signals may cause various switching circuitry in the bridge circuit 122 such as transistors to switch on and off to generate a square wave signal which is then provided to a filter 124 which filters the square wave to output a sinusoidal wave. The filter 124 may be a Pi filter in an example. A resonant circuit, also known as an LC circuit, tank circuit, or tuned circuit, is a circuit that stores energy and transfers it back and forth repeatedly between an inductor, a circuit component that stores energy in a magnetic field, and a capacitor, which stores energy in an electric field. The transmit front-end circuit 114 may receive the sinusoidal wave and provide the sinusoidal wave to one of a plurality of resonant circuits, shown as resonant circuits 150-1, 150-1, 150-3. Each resonant circuit 150-1, 150-2, 150-3 may include a respective resonant capacitor 142-1, 142-2, 143-3 and a respective coil 144-1, 144-2, 144-3. In other examples, the resonant capacitor may be shared among the resonant circuits 150. Further, the controller 106 may control to which resonant circuit the sinusoidal wave is provided. Reference to resonant circuits 150, capacitors 142, and coils 144 as described herein where not specifically identified by a "−1", "−2", or "−3" designation may refer to one instance or a plurality of instances of the respective resonant circuits, capacitors, coils depending on context and is not limited to reference to only a singular or plurality.

A resonant circuit 150 may receive the sinusoidal wave and generate an electromagnetic signal. In an example, the electromagnetic signal may have a resonance frequency which is a frequency of the resonance circuit 150 with low impedance. A coil 144 may act as an antenna and cause the electromagnetic signal at the resonance frequency to be transmitted to the wireless charging receiver 104. In an example, the resonant capacitor 142-1, 142-2, 143-3 may be programmable to control a resonance frequency of a resonance circuit 150 and frequency of the electromagnetic signal transmitted.

The wireless charging receiver 104 may have a load circuit 116 with a coil 128 and the load circuit 116 may be coupled to the battery 120. The coil 128 may act as an antenna to receive the electromagnetic signal from the transmit front end 114 and based on a power of the electromagnetic signal charge the battery 120. In an example, one or more of the coils 150-1, 150-2, 150-3 of the wireless charging transmitter 102 may each be three overlapping planar coils $C_{0t}$, $C_{1t}$, and $C_{2t}$ with two coils $C_{0t}$ and $C_{2t}$ that overlap with a center coil $C_{1t}$. In an example, the coil 128 of the wireless charging receiver 104 may be a planar coil $C_r$. With coil $C_{0t}$ being aligned with $C_r$, power is transferred from the wireless charging transmitter 102 to the wireless charging receiver 104. With coil $C_{1t}$ being aligned with $C_r$, power is transferred from the wireless charging transmitter 102 to the wireless charging receiver 104. With coil $C_{2t}$ being aligned with $C_r$, power is transferred from the wireless charging transmitter 102 to the wireless charging receiver 104. In the example, the overlapping of coils 144 is not shown for clarity purposes.

Qi of the Wireless Power Consortium defines an interface standard for wireless charging. The Qi standard may define a Baseline Power Profile (BPP) charging or Extended Power Profile (EPP) charging. The standard allows compatible devices, such as smartphones, to charge their batteries within short distances. A wireless charging system that operate using the Qi standard rely on electromagnetic induction between one of the coils 144-1, 144-2, 144-3 and the coil 128. In an example, one of the coils of the wireless charging transmitter 102 may be selected for charging the battery 120.

Qi2 of the Wireless Power Consortium also defines an interface standard for wireless charging. The Qi2 may define a magnetic power profile (MPP) charging. Unlike Qi, the wireless charging associated with Qi involves aligning the coil 128 shown as $C_r$ of the wireless charging receiver 104 with a center coil $C_{1t}$ of the three overlapping coils 144 of the wireless charging transmitter 102 (illustrated as $C_{0t}$, $C_{1t}$, $C_{2t}$) using respective magnetic ring around the center coil of the wireless charging transmitter 102 and the coil of the wireless charging receiver 104 to magnetically align the coil of the wireless charging transmitter 102 to the coil of the wireless charging receiver 104 to maximize charge transfer and increase a charging rate. Good alignment of coils is very beneficial in terms of parameters, such as coupling, power delivery capability and charging up to 15 watts in an example.

In some examples, the wireless charging transmitter 102 may not be configured with a magnetic ring around the center coil while the wireless charging receiver 104 may be configured to operate with the MPP charging and be configured with a magnetic ring 133 around the coil $C_r$. A view of the magnetic ring 133 along an edge of the magnetic ring 133 is shown in the illustration. To facilitate MPP charging with the wireless charging receiver 104, a magnetic cover 130 may be positioned over the wireless charging transmitter 102 to allow MPP charging with the wireless charging receiver 104. In an example, the magnetic cover 130 is specifically positioned over the coils 144 and a view of the magnetic cover 130 along its edge is shown in the illustration. The magnetic cover 130 has a magnetic ring 132 that aligns around a center coil 150-2 of the wireless charging transmitter 102 so that when a wireless charging receiver 104 device which supports MPP charging is proximate to the wireless charging transmitter 102 the center coil 150-2 of the wireless charging transmitter 102 is aligned with the coil 128 of the wireless charging receiver 104 to provide efficient wireless charging based on the attraction of the magnet 132 with the magnet 133 in the wireless charging receiver 104.

In an example, the wireless charging receiver 104 which supports MPP charging may also support EPP and BPP charging. The wireless charging transmitter 102 may be configured to detect positioning of the magnetic cover 130 to determine whether to perform one of BPP charging. EPP charging, or MPP charging. In an example, the positioning that is detected is whether the magnetic cover 130 is over the wireless charging transmitter 102. Some magnetic covers have physical connectors such as pins that connect to an interface of the wireless charging transmitter 102 to allow the wireless charging transmitter 102 to detect positioning of the magnetic cover. If the magnetic cover 130 is not present and not detected, the wireless charging transmitter 102 operates with EPP or BPP charging for charging using a selected coil of the three coils in the wireless charging transmitter 102. If the magnetic cover 130 is present and detected, the wireless charging transmitter 102 operates with MPP charging for efficient charging using the center coil $C_{2t}$ and coil $C_r$ for wireless charging up to 15 watts in an example.

In examples, a magnetic cover 130 might not be detected or falsely detected creating a fire risk. For instance, the physical connectors such as pins that connect to an interface of the wireless charging transmitter 102 to allow the wireless charging transmitter 102 to detect positioning of the magnetic cover 130 may be broken or not reliably indicate the positioning of the magnetic cover due to moisture infiltration. If the magnetic cover 130 is present and not detected, the wireless charging transmitter 102 may operate with EPP or BPP charging but a coil selected for EPP or BPP charging might result in overheating of the magnetic ring in the magnetic cover and creating a fire risk. Alternatively, a foreign object such as a pen or a paper clip could be in proximity to the wireless charging transmitter 102. If the foreign object is falsely detected as the magnetic cover 130, the wireless charging transmitter 102 may operate with MPP charging resulting in the foreign object overheating and creating a fire risk Embodiments disclosed herein are directed to the magnetic cover 130 configured to have one or more passive identification circuits 134 for reliable detection of positioning of the magnetic cover 130. The magnetic cover 130 is positioned over the coils 144 and has the magnetic ring 132 so that the center coil of the wireless charging transmitter 102 aligns with the coil of the wireless charging receiver 104 to provide efficient wireless charging when the wireless charging receiver 104 is positioned over the wireless charging transmitter 102. The passive identification circuit 134 further allows for the wireless charging transmitter 102 to determine positioning of the magnetic cover 130 which is more reliable than conventional physical connectors. A coil 144 of the wireless charging transmitter 102 may generate and transmit an electromagnetic signal in a resonant circuit 150 and the controller 138 may detect a response of the electromagnetic signal. The passive identification circuit 134 may be a load with a characteristic impedance and characteristic resonance frequency. In an example, the passive identification circuit 134 may be a resonant circuit with a coil 146 and capacitor 148. In an example, one of the resonant circuits 150 such as resonant circuit 150-1 may generate the electromagnetic signal which is transmitted. In an example, the electromagnetic signal transmitted by the wireless charging transmitter 102 may be received by the coil 146 of the passive identification circuit 134. The passive identification circuit 134 may generate an electromagnetic signal in response to the received electromagnetic signal which influences a phase and magnitude of the electromagnetic signal of the resonant circuit 150-1. A sensor 136 may sense a voltage of the capacitor 142-1 of the resonance circuit 150-1 to facilitate detection of a response of the electromagnetic signal in the resonance circuit 150-1 such as a magnitude and phase of the electromagnetic signal in the resonance circuit 150-1. In an example, the response of the electromagnetic signal in the resonance circuit 150-1 may be to the electromagnetic signal generated by the passive identification circuit 134. Magnetic cover detection logic 138 of the controller 106 and associated memory 152 may facilitate comparing the response of the electromagnetic signal in the resonant circuit 150-1 and the amplitude and phase of the electromagnetic signal which the controller 106 indicated via the control signals to be generated. A difference may meet predetermined criteria indicating that the magnetic cover 130 is present. In some examples, a respective response of the electromagnetic signal for a plurality of frequencies may be measured where the frequencies are above or below an operating frequency of the wireless charging transmitter 102 such as 127 kHz where wireless charging is performed. Further, the response may indicate one or more of a manufacturer, placement orientation, or other pre-defined identification detail of the magnetic cover 130. This magnetic cover detection process may be repeated using resonant circuit 150-3 as well to detect positioning of the magnetic cover 130 or confirm positioning of the magnetic cover 130 in other examples.

The wireless charging transmitter 102 may charge the wireless device with MPP charging where a center coil of the three coils in the wireless charging transmitter 102 is selected for wireless charging and is aligned with the coil of the wireless charging receiver 104 for efficient charging when the magnetic cover 130 is present. The wireless charging transmitter 102 is able to reliably detect positioning of the magnetic cover 130 and avoid falsely detecting positioning of the magnetic cover 130 to reduce risk of overheating and fire. If the magnetic cover 130 is not present, then the phase and magnitude of the electromagnetic signal of a resonant circuit 150 may not be influenced. A coil 144 of the wireless charging transmitter 102 may transmit an electromagnetic signal and detect a response of the electromagnetic signal which is substantially similar to an amplitude and phase of the electromagnetic signal which is defined by the control signals output by the controller 106. The wireless charging transmitter 102 may perform charging based on a selected coil of the three coils using EPP or BPP charging. The wireless charging transmitter 102 is able to reliably detect absence of the magnetic cover 130 and avoid falsely detecting positioning of the magnetic cover 130 which would otherwise increase risk of overheating and fire.

Figure 2:
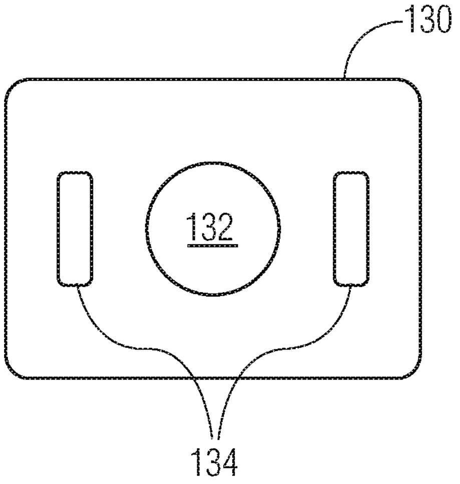
FIG. 2 illustrates an example magnetic cover of the wireless charging system in accordance with an embodiment.

FIG. 2 illustrates an example top view 200 of the magnetic cover 130 in accordance with an embodiment. The magnetic cover 130 may include the magnetic ring 132 such as a Neodymium magnet and one or more passive identification circuits 134. The magnetic ring 132 may be a circular ring with magnetic properties. The passive identification circuits 134 may be positioned outside of the magnetic ring 132. The passive identification circuits 134 may each be resonant circuits in an example. Each passive identification circuit may have a different impedance and resulting different resonance frequency in an example.

Figure 3:
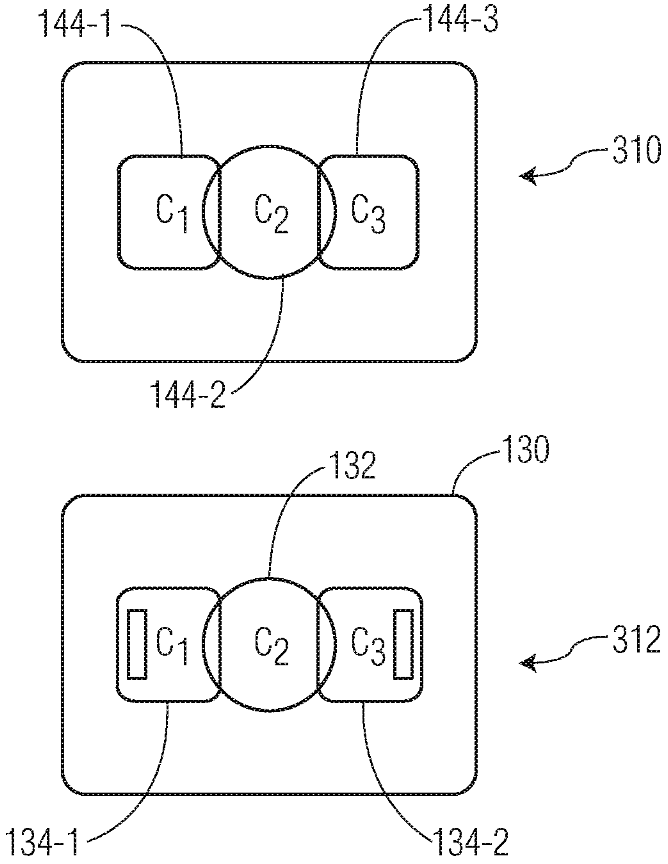
FIG. 3 illustrates example top views of a wireless charging transmitter before and after the example magnetic cover is positioned over an inductor of the wireless charging transmitter in accordance with an embodiment.

FIG. 3 illustrates example top views 300 of the wireless charging transmitter 102 before and after the example magnetic cover 130 is positioned over the wireless charging transmitter 102 in accordance with an embodiment. Top view 310 illustrates the wireless charging transmitter 102 before placement of the example magnetic cover 130 and top view 312 illustrates placement of the example magnetic cover 130 over the wireless charging transmitter 102.

The view 310 illustrates the plurality of planar coils 144. The planar coils 144 may include a plurality of overlapping coils including center coil 144-2, and side coil 144-1 and side coil 144-3 which overlaps with center coil 144-2. The side coils 144-1, 144-3 may be a rectangular planar coil and the center coil 144-2 may be a circular planar coil defined by the Qi/Qi2 standard and typically formed by conductive patterning on a printed circuit board. In an example, the center coil 144-1 may be only used for MPP charging while the center coil 144-2 and the side coils 144-1, 144-3 may be used for EPP and BPP charging. The coils 144-1 to 144-3 associated with EPP and BPP charging enable freedom of placement of the wireless charging receiver 104 over the wireless charging transmitter 102 while the center coil 144-2 may need to be aligned with a coil of the wireless charging receiver 104 during MPP charging.

The view 312 illustrates positioning of the magnetic cover 130 over the coils 144-1, 144-2, 144-3 of the wireless charging transmitter 102. In an example, a diameter of the magnetic ring 132 may be substantially the same as the center coil 144-2 and encompass the center coil 144-2. The passive identification circuits 134 may be positioned outside the magnetic ring 132 but still overlap with the side coils 144-1, 144-3. The side coils 144-1, 144-3 may be used for detection of the passive identification circuit 134 prior to EPP and BPP charging and the center coil 144-2 may be used for MPP charging. The controller 106 may detect positioning of the magnetic cover 130 based on presence of the passive identification circuits 134. In an example, coil 144-1 may generate an electromagnetic signal which is transmitted and a determination is made whether an electromagnetic signal from the passive identification circuit 134-1 within the coil 144-1 influences the electromagnetic signal in the resonance circuit 150-1. In another example, coil 144-3 may generate an electromagnetic signal which is transmitted and a determination is made whether an electromagnetic signal from a passive identification circuit 134-2 within the coil 144-3 influences the electromagnetic signal in the resonance circuit 150-3. If an influence is detected, then the magnetic cover 130 is detected and then the wireless charging transmitter 102 uses coil 144-2 for MPP charging. The wireless charging receiver 104 of the wireless device proximate to the magnetic cover 130 results in alignment of the coils 144-1 to 144-3 with the coil of the wireless charging receiver 104. Further, the magnetic ring 132 facilitates alignment of the center coil with the coil of the wireless charging receiver 104 which has a corresponding magnetic ring 133 when the wireless charging receiver 104 also supports MPP charging. If no influence is detected, then the magnetic cover 130 is not detected. The wireless charging transmitter 102 uses a selected coil of the coils 144-1 to 144-3 for EPP charging or BPP charging. In an example, the magnetic cover 130 may be secured over the coils 144 via magnets, friction, a form fitting, Velcro, or some other securing means.

Figure 4:
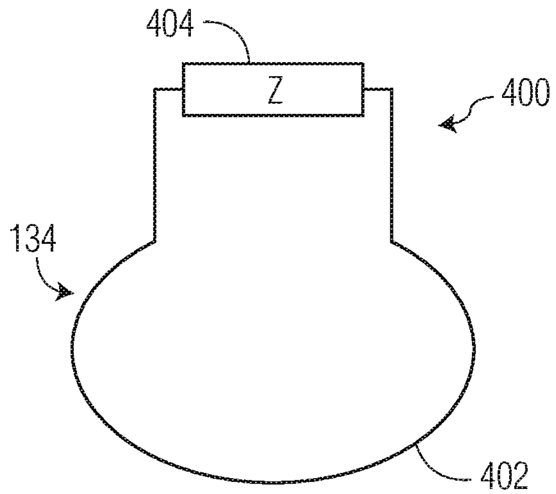
FIG. 4 illustrates an example implementation of a passive identification circuit of the example magnetic cover in accordance with an embodiment.

FIG. 4 illustrates an example implementation 400 of the passive identification circuit 134 in accordance with an embodiment. The passive identification circuit 134 may include a planar coil 402 which is assembled on or in the magnetic cover 130. The coil 402 may have a number of turns or shapes, an example of which is a circular shape, and coupled to an impedance 404 to form a resonant circuit. The impedance 404 may include linear elements such as one or more of an inductor and a capacitor or non-linear elements such as diodes or transistors. The passive identification circuit 134 may have a resonance frequency defined by the impedance 404 and an inherent impedance of the planar coil 402. Further, in some examples, the passive identification circuit 134 may have one or more resonance frequencies. The resonance frequency may be different from the operating frequency of the wireless charging transmitter 102 such as 127 kHz and each passive identification circuit 134 on the magnetic cover 130 may have a respective resonance frequency to facilitate detection of the respective passive identification circuit 134 and distinguishable from a resonance caused by a foreign object. The wireless charging transmitter 102 may separately detect presence of the two passive identification circuits 134 with different resonance frequencies which increases chances that a foreign object in presence of the wireless charging transmitter 102 would be falsely detected as the magnetic cover 130.

Figure 5:
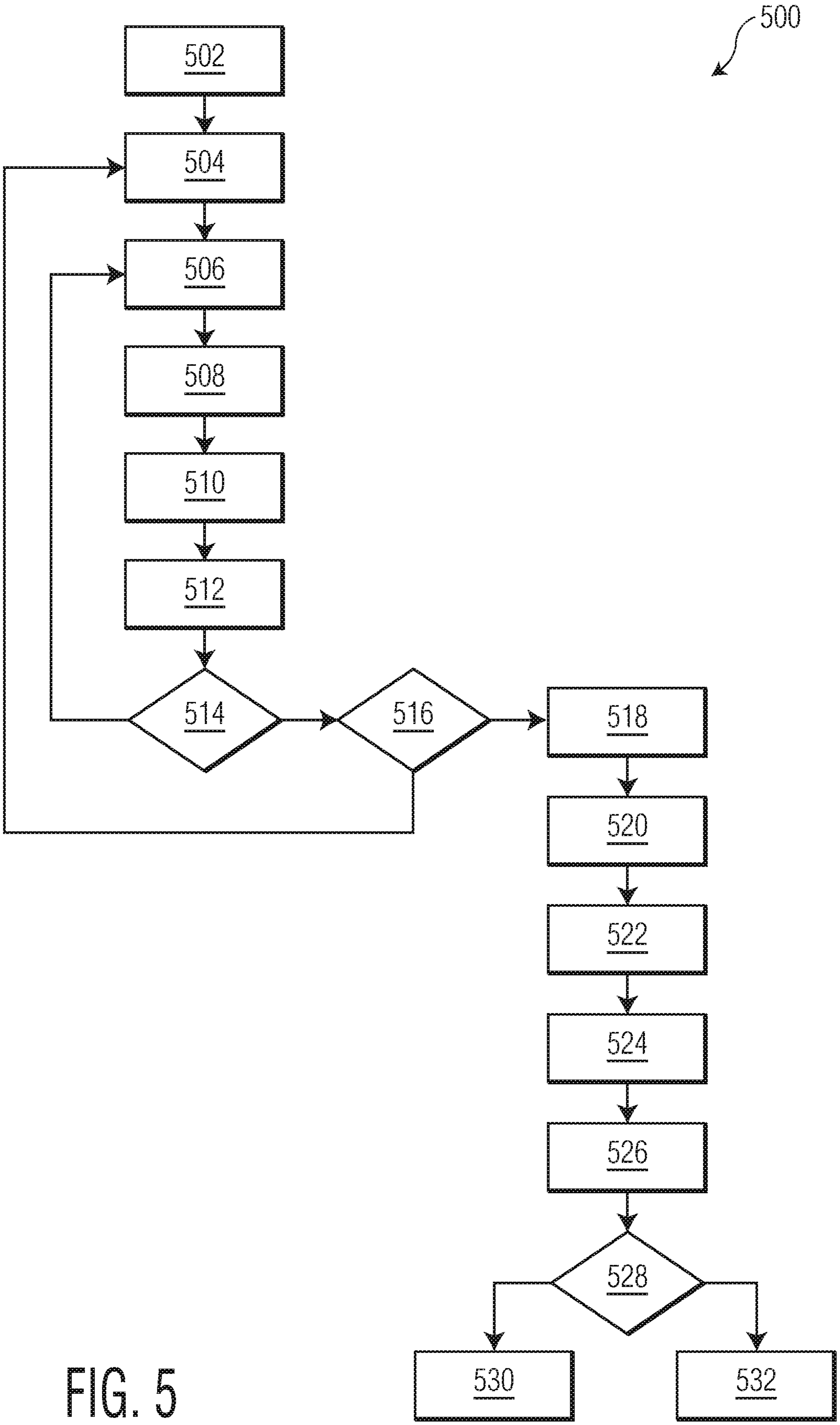
FIG. 5 is a flow chart of functions associated with detection of the example magnetic cover in accordance with an embodiment.

FIG. 5 is a flow chart of functions 500 associated with detection of the magnetic cover 130 positioned over the wireless charging transmitter 102 in accordance with an embodiment. The functions 500 may be performed by one or more of the wireless charging transmitter 102 and wireless charging receiver 104 in an example. The functions 500 may include initialization functions to determine an operation of the wireless charging transmitter 102 with and without the magnetic cover 130 positioned over the wireless charging transmitter followed by detection functions to detect positioning of the magnetic cover 130 during a field operation.

Steps 502-518 may be initialization functions associated with determining operation of the wireless charging transmitter when a magnetic cover is not positioned over the wireless charging transmitter. At 502, a magnetic cover is not positioned over the wireless charging transmitter. The wireless charging transmitter may have a plurality of coils including the center coil and two side coils which overlap with the center coil. At 504, the controller selects one coil of two coils that overlap with a center coil of the coils of the wireless charging transmitter to output an electromagnetic signal. The selected coil may be used to detect presence of a passive identification circuit 134 and positioning of a magnetic cover 130 over the wireless charging transmitter 102. At 506, a controller 106 also selects a frequency of an electromagnetic signal from a plurality of frequencies. In an example, the frequency selected may be a resonance frequency associated with the resonant circuit of the selected coil. The selected frequency may be greater or less than an operating frequency of the wireless charging transmitter 102 during charging such as 127 kHz and typically is greater or less by a predefined margin. At 508, the controller 106 cause an electromagnetic signal with the selected frequency to be generated in a resonance circuit 150 having the selected coil and transmitted by the selected coil. The electromagnetic signal may be a low power signal rather than a high power signal used for wireless charging. At 510, a response of the electromagnetic signal and PWM wave output by the driver circuit is measured. In an example, the response may include determining a minimum amplitude or maximum amplitude of the electromagnetic signal in the resonant circuit using the sensor. In an example, the response may include determining a phase of the electromagnetic signal over time using the sensor. In an example, the response of the electromagnetic signal in the resonance circuit of the wireless charging transmitter may be affected by any electromagnetic signals in an environment in which the wireless charging system 100 is located or to no other electromagnetic signal in which case the response is no response. At 512, a difference between the phase of the electromagnetic wave in the resonant circuit 150 for the selected frequency and a phase of the PWM wave of the PWM circuit 108 for the selected frequency is determined for the selected coil. In an example, the controller 106 may be able to determine the phase of the PWM wave based on the control signals provided to the driver circuit 108. In an example, the phase difference is defined by the phase change from a peak of the electromagnetic signal to the peak of the PWM wave, or vice versa. At 514, a determination is made whether the response is determined for frequencies of a plurality of frequencies for the selected coil. If the frequencies have not been exercised, then processing returns to 506 to select another frequency for the electromagnetic signal generated by the wireless charging transmitter 102. If the frequencies have been exercised, then at 516 a phase graph is generated which plots the phase difference as a function of frequency and a determination is made whether the response is determined for coils of the plurality of coils. If the coils have not been exercised, then processing returns to 504 to select another coil for which a respective phase graph is determined. If the coils have been exercised, then the phase graph for each coil for when the magnetic cover is not over the wireless charging transmitter is stored in the memory 152 of the controller 106 at 518. In an example, the coils which are exercised may be the side coils of the coils 144.

Steps 520-524 may also be initialization functions associated with determining operation of the wireless charging transmitter when a magnetic cover is positioned over the wireless charging transmitter. At step 520, the magnetic cover is positioned over the wireless charging transmitter. At step 522, functions of steps 504-518 are repeated to determine a phase graph for when the magnetic cover is over the wireless charging transmitter which is stored in the memory 152 of the controller 106. In an example, the phase graph may indicate the response of the electromagnetic signal in the resonance circuit of the wireless charging transmitter to an electromagnetic signal transmitted by the passive identification circuit in the magnetic cover. At 524, a determination is made that the phase graphs are different for a same coil with and without the magnetic cover. The different phase graphs indicate that placement of the magnetic cover over the wireless charging transmitter compared to no placement of the magnetic cover over the wireless charging transmitter is distinguishable. If the placement is not distinguishable, then a resonance frequency of the passive identification circuit 134 may need to be adjusted by changing its impedance in an example.

Steps 526-532 may be detection functions associated with determining whether a magnetic cover is positioned over the wireless charging transmitter 102 during a field operation as an example when it is not known whether or not the magnetic cover 130 is positioned over the wireless charging transmitter 102. A user may place a wireless device having a wireless charging receiver 104 with MPP charging capability (in addition to EPP and BPP charging capability) on the wireless charging transmitter. In order to perform MPP charging, a determination needs to be made whether the magnetic cover 130 is positioned over the wireless charging transmitter 102. At 526, a phase graph associated with the wireless charging transmitter is determined by performing steps 504-518. At 528, a determination is made whether the phase graph determined in step 526 is substantially different from the phase graph when the magnetic cover is not over the wireless charging transmitter for a same coil. For example, the phase graphs may be different if the phase graph associated with whether the magnetic cover 130 is over the wireless charging transmitter 102 has a peak at a resonance frequency of the passive identification device. If the responses are substantially different, then the magnetic cover 130 is present and MPP charging is performed at step 530. If the responses are substantially different, then the magnetic cover 130 is not present and BPP or EPP charging is performed at step 532.

In an example, steps 526-532 may be performed before an analog or digital ping associated with the wireless charging in an example. Pinging is a process of detecting a wireless charging receiver in presence of the wireless charging transmitter as defined by the Qi and Qi2 standard and selection of a coil for wireless charging. If a response to the pinging is received, then the wireless charging transmitter transmits a charging electromagnetic signal with a high power to perform a power transfer to charge the wireless device. If no response is received in response to the pinging, then the wireless charging transmitter does not transmit the charging electromagnetic signal with high power to perform a power transfer to charge the wireless device.

The magnetic cover 130 with the passive identification circuit 134 allows for reliable detection of the magnetic cover 130 so that the wireless device is efficiently charged when the magnetic cover 130 is present. The passive identification circuit 134 in the magnetic cover 130 also reduce risk of overheating or fire because the wireless charging transmitter 102 is able to avoid falsely detecting a presence of foreign object as a positioning of the magnetic cover 130 and performing MPP charging and avoid failing to detect positioning of the magnetic cover 130 and performing EPP or BPP charging.

Figure 6A:
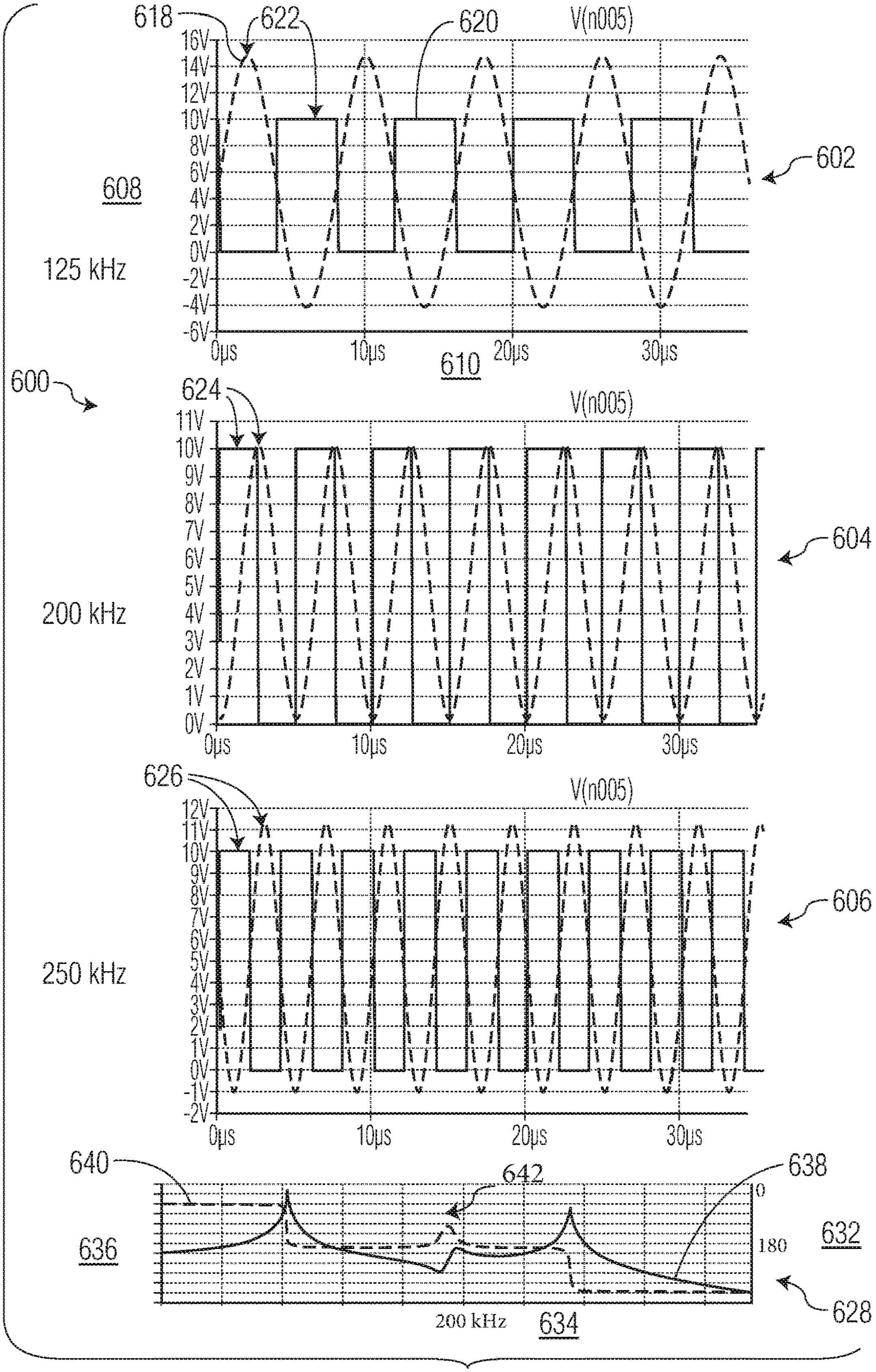
FIGS. 6A & 6B illustrate example simulations associated with detection of the example magnetic cover in accordance with an embodiment.
Figure 6B:
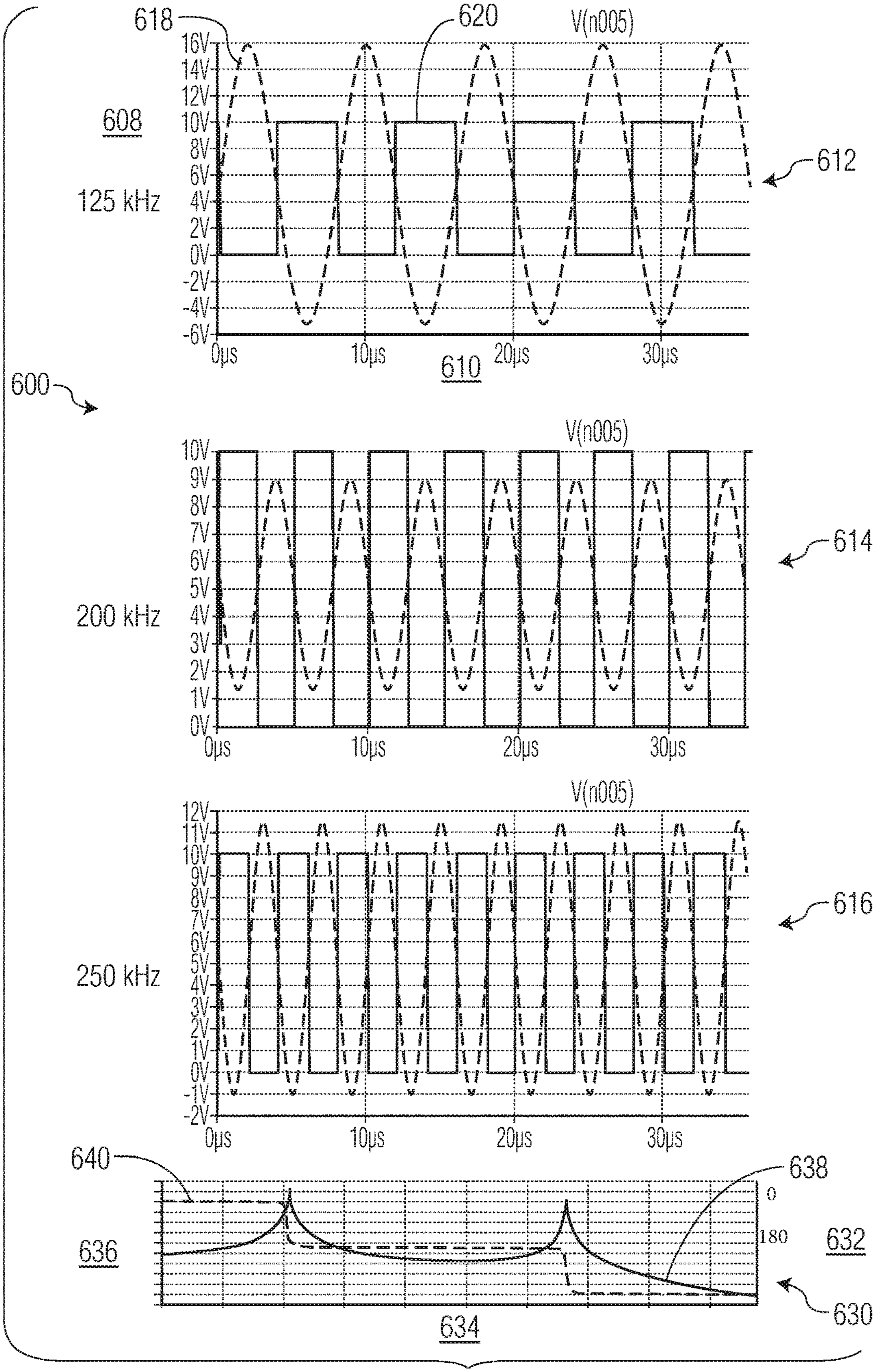

FIGS. 6A & 6B illustrate example response simulations 600 associated with detection of the magnetic cover 130 in accordance with an embodiment. In the simulation 600, plots 602-606 show a voltage on axis 608 as a function of time on axis 610 when the magnetic cover 130 is positioned over the wireless charging transmitter 102 and plots 612-616 show a voltage on axis 608 as a function of time on axis 610 when the magnetic cover is not positioned over the wireless charging transmitter. In an example, inductive coupling between one of the coils 144 and the coil 146 may define when the magnetic cover 130 is positioned over the wireless charging transmitter 102 and is approximately set to 0.2 to 0.4 corresponding to a high inductive coupling when the magnetic cover 130 is in proximity (FIG. 6A) to the wireless charging transmitter 102 and less than 0.2 and asymptotically going to zero corresponding to a low inductive coupling when the magnetic cover 130 is not in proximity (FIG. 6B) to the wireless charging transmitter 102. The coupling factor is a value between 0 and 1 where 1 expresses a perfect coupling. i.e. all flux generated by a transmitter coil penetrates a receiver coil and a value of 0 when there is no coupling. Further, the plots 602-606 and plots 612-616 show different frequencies of an electromagnetic signal generated by the wireless charging transmitter 102 in a range of 125 kHz to 250 kHz.

Each plot includes a waveform 618 which is an example waveform of a voltage across a capacitor 142 as a function of time in a resonant circuit 150 and a PWM waveform 620 output by the PWM circuit 108 as a function of time. The waveform 618 may be indicative of the response of the electromagnetic signal in the resonant circuit of the wireless charging transmitter. The response may be to the electromagnetic signal transmitted by the passive identification circuit, to some other electromagnetic signal, or to no other electromagnetic signal in which case the response is no response.

For example, the voltage across the capacitor 142-1 as a function of time is indicative of the electromagnetic signal generated in the resonant circuit 150-1. For different frequencies in the plots 602-606, the waveform 618 and the waveform 620 may have a corresponding phase difference shown as 622-626 in plots 602-606. In the example, plots 622 and 626 at a frequency of 125 kHz and 250 kHz may have a phase difference of 180 degrees at respective peaks and plot 624 may have a phase difference of 90 degrees at respective peaks. The phase difference is defined by the phase change from a peak of the electromagnetic signal 618 to the peak of the PWM wave 620, or vice versa. Plots 612-616 may have similar phase differences associated with the different frequencies. In the example, plots 612-616 may have a phase difference of 180 degrees.

Plot 628, 630 show a magnitude difference waveform 638 between the waveforms 618, 620 and a phase difference waveform 640 between the waveforms 618, 620 as a function of frequency. Plot 628 shows the differences as a function of frequency when a magnetic cover 130 is positioned over the wireless charging transmitter 102 while plot 630 shows the differences as a function of frequency when a magnetic cover is not positioned over the wireless charging transmitter 102. The phase difference is indicated on axis 632, the frequency is shown on axis 634, and the magnitude difference is shown on axis 636. The phase difference may be a difference in phase between the PWM waveform and the electromagnetic signal of a resonant circuit 150 such as resonant circuit 150-1, 150-3 as a function of frequency and the magnitude difference may be a difference in magnitude between the PWM waveform and the electromagnetic wave of the resonant circuit 150 such as resonant circuit 150-1, 150-3 as a function of frequency. In an example, the phase difference waveform 640 is also referred to as the phase graph for a coil. In the simulation, the passive identification circuit 134 may have a resonance frequency of 200 kHz. In the example, the phase difference waveform 640 in the phase graph may change at around 200 kHz with a defined peak 642 of 90 degrees phase change compared to other frequencies between 100 kHz and 250 kHz with a phase peak of 180 degrees indicating detection of the passive identification circuit and positioning of the magnetic cover 130. The phase difference waveform 640 with the peak at around 200 kHz also corresponds to a resonance of the passive identification circuit 134. Further, the phase difference waveform 640 in the phase graph 630 may not substantially change from the 180 degrees phase difference in the same range of frequencies when the magnetic cover 130 is not present also suggesting detection of the passive identification circuit 134 of the magnetic cover 130. Further, the magnitude difference waveform 638 in the same frequency range may be less indicative of presence of the passive identification circuit 134 because there is no clear single peak in the response. If a change in phase difference is indicated at a plurality of frequencies other than the resonant frequency of the passive identification circuit 134 or no single peak is present, a foreign object may be present rather than the magnetic cover 130. Alternatively, a foreign object will result in a phase difference at a plurality of frequencies rather than a single frequency associated with the resonance frequency of the passive identification circuit 134.

In the example, the magnetic cover is shown with a passive identification circuit. The magnetic cover is an example of a wireless device accessory and the passive identification circuit may be used with other accessories to identify presence of other accessories in accordance the disclosed embodiments.

In an example, a method for a wireless charging transmitter to detect positioning of a magnetic cover is disclosed. The method comprises: transmitting a plurality of electromagnetic signals generated in a resonance circuit of the wireless charging transmitter, each electromagnetic signal having a respective frequency; for each frequency, determining a difference in phase between a pulse width modulation (PWM) wave which generates the electromagnetic signal in the resonance circuit at the frequency and a response of the electromagnetic signal in the resonance circuit at the frequency, wherein the differences as a function of frequency of the electromagnetic signal define a phase graph; based on the phase graph not indicating a peak phase difference, detecting that the magnetic cover is not positioned over the wireless charging transmitter and performing a charging using a selected one of three coils; and based on the phase graph indicating the peak phase difference, detecting that the magnetic cover is positioned over the wireless charging transmitter and performing the charging using only a center coil of the three coils. In an example, the phase graph is a first phase graph, the method further comprising: for each frequency, determining a difference in phase between a pulse width modulation (PWM) wave which generates an electromagnetic signal in the resonance circuit at the frequency and a response of the electromagnetic signal in the resonance circuit at the frequency when the magnetic cover is not positioned over the wireless charging transmitter, wherein the differences when the magnetic cover is not positioned over the wireless charging transmitter as a function of frequency of the electromagnetic signal define a second phase graph; based on the first phase graph being substantially the same as the second phase graph, performing the charging using the selected one of three coils; and based on the first phase graph not being substantially the same as the second phase graph, performing the charging using only the center coil of the three coils. In an example, the method further comprises detecting the peak phase difference between a peak voltage of the PWM wave and a peak voltage of the electromagnetic signal. In an example, the method further comprises receiving from a passive identification circuit of the magnetic cover an electromagnetic signal which changes a phase of the electromagnetic signal in the resonant circuit, the peak phase difference being at a resonant frequency of the resonant circuit and the response of the electromagnetic signal to the received electromagnetic signal from the passive identification circuit indicating the phase change. In an example, a resonance frequency of the passive identification circuit is 200 k Hz and the electromagnetic wave is greater or less than a frequency of 127 kHz. In an example, detecting that the magnetic cover is not positioned over the wireless charging transmitter further comprises performing wireless charging based on an extended power profile (EPP) charging or basic power profile (BPP) charging associated with a Qi standard. In an example, detecting that the magnetic cover is positioned over the wireless charging transmitter further comprises performing wireless charging based on a magnetic power profile (MPP) charging associated with a Qi2 standard.

In another embodiment, a magnetic cover which is configured to be positioned on a wireless charging transmitter is disclosed. The magnetic cover comprises: a magnetic ring wherein when the magnetic cover is positioned over the wireless charging transmitter, the magnetic ring encompasses a center planar charging coil of the wireless charging transmitter; and a plurality of passive identification circuits, each identification circuit having a respective resonance frequency, wherein when the magnetic cover is positioned over the wireless charging transmitter, the plurality of passive identification circuits overlaps with a side planar charging coil of the wireless charging transmitter and the side planar charging coil overlaps with the center planar charging coil; wherein the passive identification circuits facilitates detection of the magnetic cover by the wireless charging transmitter. In an example, the plurality of passive identification circuits is positioned outside the magnetic ring. In an example, each of the plurality of passive identification circuits comprises a planar coil coupled to a capacitor and inductor. In an example, the respective resonance frequency of a passive identification circuit is further based on an impedance of a planar coil. In an example, the planar coil is circular in shape.

In yet another embodiment, a wireless charging transmitter configured to detect positioning of a magnetic cover is disclosed. The wireless charging transmitter comprises: a resonance circuit comprising three coils, wherein the three coils includes a center coil and two side coils which overlap with the center coil; and a controller configured to cause transmission of a plurality of electromagnetic signals generated in a resonance circuit of the wireless charging transmitter, each electromagnetic signal having a respective frequency; for each frequency, determine a difference in phase between a pulse width modulation (PWM) wave which generates the electromagnetic signal in the resonant circuit at the frequency and a response of the electromagnetic signal in the resonant circuit at the frequency, wherein the differences as a function of frequency of the electromagnetic signal define a phase graph; based on the phase graph not indicating a peak phase difference, detect that the magnetic cover is not positioned over the wireless charging transmitter and performing a charging using a selected one of three coils; and based on the phase graph indicating the peak difference, detect that the magnetic cover is positioned over the wireless charging transmitter and performing the charging using only the center coil of the three coils. In an example, the phase graph is a first phase graph, and wherein the wireless charging transmitter is further configured for each frequency, to determine a difference in phase between a pulse width modulation (PWM) wave which generates an electromagnetic signal in the resonant circuit at the frequency and a response of the electromagnetic signal in the resonant circuit at the frequency when the magnetic cover is not positioned over the wireless charging transmitter, wherein the differences when the magnetic cover is not positioned over the wireless charging transmitter as a function of frequency of the electromagnetic signal define a second phase graph; based on the first phase graph being substantially the same as the second phase graph, perform the charging using the selected one of three coils; and based on the first phase graph not being substantially the same as the second phase graph, perform the charging using only the center coil of the three coils. In an example, the wireless charging transmitter further comprises the controller configured to detect the peak phase difference between a peak voltage of the PWM wave and a peak voltage of the electromagnetic signal. In an example, the wireless charging transmitter further comprises the resonant circuit configured to receive from a passive identification circuit of the magnetic cover an electromagnetic signal which changes a phase of the electromagnetic signal in the resonant circuit, the peak phase difference being at a resonant frequency of the resonant circuit and the response of the electromagnetic signal to the received electromagnetic signal from the passive identification circuit indicating the phase change. In an example, a resonance frequency of the resonant circuit is 200 kHz and the electromagnetic signal is greater or less than a frequency of 127 kHz. In an example, the center coil is positioned within a magnetic ring of the magnetic cover and a plurality of passive identification circuits of the magnetic cover overlaps with the side coils when the magnetic cover is positioned over the wireless charging transmitter. In an example, the controller configured to detect that the magnetic cover is not positioned over the wireless charging transmitter further comprises the controller configured to perform wireless charging based on an extended power profile (EPP) charging or basic power profile (BPP) charging associated with a Qi standard. In an example, the controller configured to detect that the magnetic cover is positioned over the wireless charging transmitter further comprises the controller configured to perform wireless charging based on a magnetic power profile (MPP) charging associated with a Qi2 standard.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method for a wireless charging transmitter to detect positioning of a magnetic cover, the method comprising:

transmitting a plurality of electromagnetic signals generated in a resonance circuit of the wireless charging transmitter, each electromagnetic signal having a respective frequency;

for each frequency, determining a difference in phase between a pulse width modulation (PWM) wave which generates the electromagnetic signal in the resonance circuit at the frequency and a response of the electromagnetic signal in the resonance circuit at the frequency, wherein the differences as a function of frequency of the electromagnetic signal define a phase graph;

based on the phase graph not indicating a peak phase difference, detecting that the magnetic cover is not positioned over the wireless charging transmitter and performing a charging using a selected one of three coils; and based on the phase graph indicating the peak phase difference, detecting that the magnetic cover is positioned over the wireless charging transmitter and performing the charging using only a center coil of the three coils.

2. The method of claim 1, wherein the phase graph is a first phase graph, the method further comprising: for each frequency, determining a difference in phase between a pulse width modulation (PWM) wave which generates an electromagnetic signal in the resonance circuit at the frequency and a response of the electromagnetic signal in the resonance circuit at the frequency when the magnetic cover is not positioned over the wireless charging transmitter, wherein the differences when the magnetic cover is not positioned over the wireless charging transmitter as a function of frequency of the electromagnetic signal define a second phase graph; based on the first phase graph being substantially the same as the second phase graph, performing the charging using the selected one of three coils; and based on the first phase graph not being substantially the same as the second phase graph, performing the charging using only the center coil of the three coils.

3. The method of claim 1, further comprising detecting the peak phase difference between a peak voltage of the PWM wave and a peak voltage of the electromagnetic signal.

4. The method of claim 1, further comprising receiving from a passive identification circuit of the magnetic cover an electromagnetic signal which changes a phase of the electromagnetic signal in the resonant circuit, the peak phase difference being at a resonant frequency of the resonant circuit and the response of the electromagnetic signal to the received electromagnetic signal from the passive identification circuit indicating the phase change.

5. The method of claim 4, wherein a resonance frequency of the passive identification circuit is 200 kHz and the electromagnetic wave is greater or less than a frequency of 127 kHz.

6. The method of claim 1, wherein detecting that the magnetic cover is not positioned over the wireless charging transmitter further comprises performing wireless charging based on an extended power profile (EPP) charging or basic power profile (BPP) charging associated with a Qi standard.

7. The method of claim 1, wherein detecting that the magnetic cover is positioned over the wireless charging transmitter further comprises performing wireless charging based on a magnetic power profile (MPP) charging associated with a Qi2 standard.

8. A magnetic cover which is configured to be positioned on a wireless charging transmitter, the magnetic cover comprising:

a magnetic ring wherein when the magnetic cover is positioned over the wireless charging transmitter, the magnetic ring encompasses a center planar charging coil of the wireless charging transmitter; and a plurality of passive identification circuits, each identification circuit having a respective resonance frequency, wherein when the magnetic cover is positioned over the wireless charging transmitter, the plurality of passive identification circuits overlaps with a side planar charging coil of the wireless charging transmitter and the side planar charging coil overlaps with the center planar charging coil;

wherein the passive identification circuits facilitates detection of the magnetic cover by the wireless charging transmitter.

9. The magnetic cover of claim 8, wherein the plurality of passive identification circuits is positioned outside the magnetic ring.

10. The magnetic cover of claim 8, wherein each of the plurality of passive identification circuits comprises a planar coil coupled to a capacitor and inductor.

11. The magnetic cover of claim 10, wherein the respective resonance frequency of a passive identification circuit is further based on an impedance of a planar coil.

12. The magnetic cover of claim 10, wherein the planar coil is circular in shape.

13. A wireless charging transmitter configured to detect positioning of a magnetic cover, the wireless charging transmitter comprising:

a resonance circuit comprising three coils, wherein the three coils includes a center coil and two side coils which overlap with the center coil; and a controller configured to cause transmission of a plurality of electromagnetic signals generated in a resonance circuit of the wireless charging transmitter, each electromagnetic signal having a respective frequency; for each frequency, determine a difference in phase between a pulse width modulation (PWM) wave which generates the electromagnetic signal in the resonance circuit at the frequency and a response of the electromagnetic signal in the resonance circuit at the frequency, wherein the differences as a function of frequency of the electromagnetic signal define a phase graph; based on the phase graph not indicating a peak phase difference, detect that the magnetic cover is not positioned over the wireless charging transmitter and performing a charging using a selected one of three coils; and based on the phase graph indicating the peak difference, detect that the magnetic cover is positioned over the wireless charging transmitter and performing the charging using only the center coil of the three coils.

14. The wireless charging transmitter of claim 13, wherein the phase graph is a first phase graph, and wherein the wireless charging transmitter is further configured for each frequency, to determine a difference in phase between a pulse width modulation (PWM) wave which generates an electromagnetic signal at the frequency in the resonance circuit and a response of the electromagnetic signal in the resonance circuit at the frequency when the magnetic cover is not positioned over the wireless charging transmitter, wherein the differences when the magnetic cover is not positioned over the wireless charging transmitter as a function of frequency of the electromagnetic signal define a second phase graph; based on the first phase graph being substantially the same as the second phase graph, perform the charging using the selected one of three coils; and based on the first phase graph not being substantially the same as the second phase graph, perform the charging using only the center coil of the three coils.

15. The wireless charging transmitter of claim 13, further comprising the controller configured to detect the peak phase difference between a peak voltage of the PWM wave and a peak voltage of the electromagnetic signal.

16. The wireless charging transmitter of claim 13, further comprising the resonant circuit configured to receive from a passive identification circuit of the magnetic cover an electromagnetic signal which changes a phase of the electromagnetic signal in the resonant circuit, the peak phase difference being at a resonant frequency of the resonant circuit and the response of the electromagnetic signal to the received electromagnetic signal from the passive identification circuit indicating the phase change.

17. The wireless charging transmitter of claim 16, wherein a resonance frequency of the resonant circuit is 200 kHz and the electromagnetic signal is greater or less than a frequency of 127 kHz.

18. The wireless charging transmitter of claim 16, wherein the center coil is positioned within a magnetic ring of the magnetic cover and a plurality of passive identification circuits of the magnetic cover overlaps with the side coils when the magnetic cover is positioned over the wireless charging transmitter.

19. The wireless charging transmitter of claim 13, wherein the controller configured to detect that the magnetic cover is not positioned over the wireless charging transmitter further comprises the controller configured to perform wireless charging based on an extended power profile (EPP) charging or basic power profile (BPP) charging associated with a Qi standard.

20. The wireless charging transmitter of claim 13, wherein the controller configured to detect that the magnetic cover is positioned over the wireless charging transmitter further comprises the controller configured to perform wireless charging based on a magnetic power profile (MPP) charging associated with a Qi2 standard.

* * * * *